United States Patent [19]
Hsieh et al.

[11] Patent Number: 5,574,732
[45] Date of Patent: Nov. 12, 1996

[54] TEST PATTERN GENERATOR

[75] Inventors: Cheng-Ju Hsieh, Hsinchu Hsien; Chien-Chung Pan, Taichung, both of Taiwan

[73] Assignee: United Microelectronics Corporation, Hsinchu, Taiwan

[21] Appl. No.: 439,968

[22] Filed: May 12, 1995

[51] Int. Cl.$^6$ .................................................. G01R 31/28
[52] U.S. Cl. .......................................... 371/27; 395/183.06
[58] Field of Search ............................ 371/27, 23.1, 15.1; 328/158 R; 395/183.06

[56]  References Cited

U.S. PATENT DOCUMENTS 5,090,035  2/1992  Murase .............................. 377/72
5,187,712  2/1993  Malleo-Roach et al. .............. 371/22.1

*Primary Examiner*—Vincent P. Canney
*Attorney, Agent, or Firm*—Ladas & Parry

[57]  ABSTRACT

A test pattern generator accompanying digital integrated circuits for successively generating a plurality of test patterns for a built-in self test. A plurality of shift registers are serially connected in a loop for successively outputting the test patterns in response to a clock signal. At least one logic gate is connected among the shift registers. At least one control means is connected within the loop. Using such a configuration, the shift registers are set to an initial pattern. The shift registers are then set to one of a plurality of test patterns. The test patterns are then successively output through the shift registers in response to the clock signal.

8 Claims, 3 Drawing Sheets

TEST PATTERN GENERATOR

BACKGROUND OF THE INVENTION

1. Field of the Invention

The present invention relates generally to a built-in self test (BIST) technique, and relates more particularly to a test pattern generator which does not fall into a self looping mode.

2. Technical Background

Digital integrated circuits are conventionally tested by successively applying test patterns to the inputs of the circuit. Upon receipt of each test pattern, which is composed of a plurality of ones and zeros, the circuit responds by producing a result at its outputs, each result also being composed of a pattern of ones and zeros. When the circuit is operating properly, the response at each output of the circuit will match an expected result for each input test pattern. If an fault exists, then a mismatch occurs. Usually, a set of test patterns is generated by a test pattern generator which is constructed in the same chip with a core circuit. When powering thereon, the test pattern generator (TPG) is triggered to generate a plurality of test patterns to the inputs of the core circuit, successively. This is a built-in self test (BIST) technique.

If a higher percentage of possible faults can be detected, there is a greater confidence in the lack of any faults in the circuit. However, achieving 100% fault coverage is typically very difficult without exhaustive testing. In the past, testing of a circuit has been accomplished by first mathematically modeling the circuit and all its possible faults. Using the mathematical model, a set of test patterns is then generated. While algorithms for fault simulation and test pattern generation exist, applying such algorithms to a circuit of even moderate complexity is a time-consuming task, often requiring weeks or months of effort. Thus, there is a need for a technique for achieving 100% fault coverage of a sequential digital integrated circuit without the need for fault simulation or deterministic test generation.

Conventional test pattern generator 100 is shown in FIG. 1, which exemplifies a typical 4-bit TPG. The circuit is based on the concept of the linear code proposed by Peterson & Welden in 1972, and Lin & Costella in 1983. In the drawing, conventional test pattern generator 100 makes use of four D-type flip-flops as shift registers. These four shift registers 11, 12, 13, and 14 are respectively provided with inputs D1, D2, D3, and D4, and four outputs Q1, Q2, Q3, and Q4 connected in a close loop. In such a way, output Q1 of first shift register 11 is connected to input D2 of second shift register 12. Output Q2 of second shift register 12 is connected to input D3 of third shift register 13. Output Q4 of fourth shift register 14 is connected to input D1 of first shift register 11. Further, outputs Q3 and Q4 of third and fourth shift registers 13 and 14 pass through exclusive-OR (XOR) gate 10 serving as input D4 of fourth shift register 14. Furthermore, all of clock terminals CK1, CK2, CK3, and CK4 thereof are coupled to clock signal CLK. In Table 1, the truth table of the sequences associated with outputs Q1, Q2, Q3, and Q4, in response to the clock signal CLK, are listed.

TABLE 1

| CLK | Q1 | Q2 | Q3 | Q4 |
|---|---|---|---|---|
| 1 | 1 | 0 | 0 | 0 |
| 2 | 0 | 1 | 0 | 0 |
| 3 | 0 | 0 | 1 | 0 |
| 4 | 0 | 0 | 0 | 1 |
| 5 | 1 | 0 | 0 | 1 |
| 6 | 1 | 1 | 0 | 1 |
| 7 | 1 | 1 | 1 | 1 |
| 8 | 1 | 1 | 1 | 0 |
| 9 | 0 | 1 | 1 | 1 |
| 10 | 1 | 0 | 1 | 0 |
| 11 | 0 | 1 | 0 | 1 |
| 12 | 1 | 0 | 1 | 1 |
| 13 | 1 | 1 | 0 | 0 |
| 14 | 0 | 1 | 1 | 0 |
| 15 | 0 | 0 | 1 | 1 |
| 16 | 1 | 0 | 0 | 0 |

Initially, assuming that (Q1,Q2,Q3,Q4) is (1,0,0,0), the test pattern appears at the outputs Q1, Q2, Q3, and Q4 in the sequence from the top to the bottom, in accordance with Table 1. For example, (Q1,Q2,Q3,Q4) is (1,0,0,0) in the first clock period, (Q1,Q2,Q3,Q4) is (0,1,0,0) in the second clock period, (Q1,Q2,Q3,Q4) is (1,0,0,1) in the fifth period, (Q1, Q2,Q3,Q4) is (1,0,1,0) in the tenth period, and (Q1,Q2,Q3, Q4) is (0,0,1,1) in the fifteenth period, and so on. Notice should be taken that the test pattern starts to recur again after fifteen clock CLK periods, namely, that (Q1,Q2,Q3,Q4) is (1,0,0,0) once again. In other words, the circuit, shown in FIG. 1, accomplishes 15 separate test patterns during 15 CLK periods. For a 4-bit circuit, Table 1 consists of nearly all possible faults of a sequential digital integrated circuit except for an all zeros pattern, (0,0,0,0). However, when falling into a pattern of all zeros, which can occur after power on/reset or result from external radiation interference, the test pattern generator will sink into a self-looping mode because of the XOR gate operation. Therefore, the TPG 100 will not follow the sequence depicted in Table. 1 and the testing thereof is failed. Moreover, the conventional test pattern generator can not achieve 100% fault coverage because of being prohibited from operating properly with the pattern of all zeros. Accordingly, the conventional test pattern generator of the prior art isn't an exhaustive test pattern generator, but merely a pseudo-exhaustive one.

SUMMARY OF THE INVENTION

In light of the prior art test pattern generator problems described above, in accordance with the present invention a test pattern generator is provided which can avoid sinking into a self-looping condition while providing exhaustive test pattern generation.

A test pattern generator which attains the above-described objects includes a plurality of shift registers which are serially connected in a loop for successively outputting the test patterns in response to a clock signal. At least one logic gate is connected between the shift registers. At least one control means is connected within the loop. Using such a configuration, the shift registers are set to an initial pattern. The shift registers are then set to one of a plurality of test patterns. The test patterns are then successively output through the shift registers in response to the clock signal.

Other objects, features and advantages of the present invention will become apparent by way of the following detailed description of the preferred but non-limiting embodiment.

BRIEF DESCRIPTION OF THE DRAWINGS

The detailed description of a preferred embodiment of the present invention is made with reference to the accompanying drawings, wherein.

DESCRIPTION OF THE PREFERRED EMBODIMENT

Figure 2:
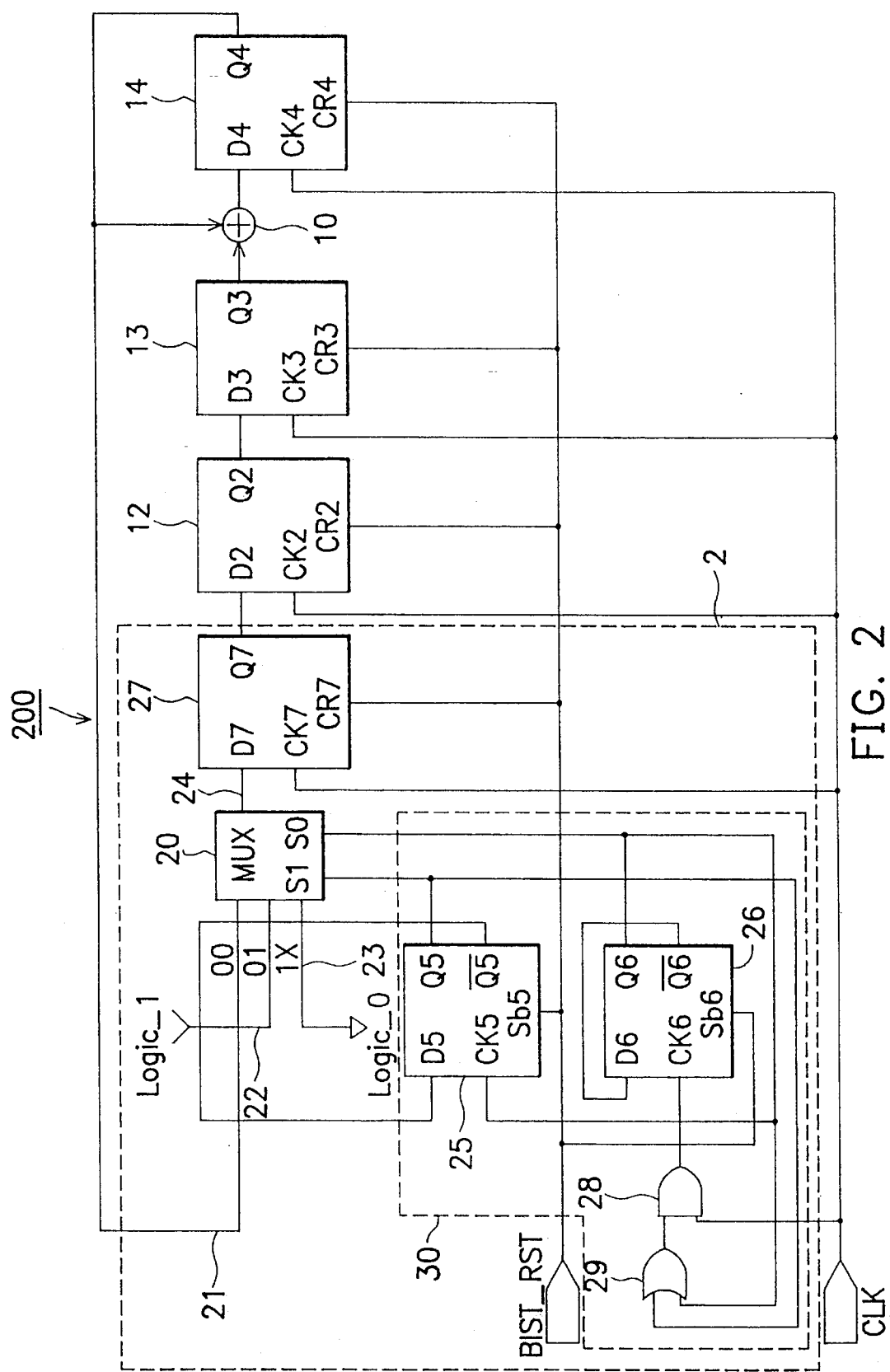
FIG. 2 schematically depicts the circuit of one preferred embodiment in accordance with the present invention.

Referring to FIG. 2, the circuit diagram of one preferred embodiment according to the present invention is shown. Test pattern generator 200 exemplifies a 4-bit circuit. In comparison with conventional test pattern generator 100, the present invention has replaced any one of the shift registers by circuit 2. For example, in FIG. 2 first shift register 11 is replaced by the circuit 2. To prevent the self-looping phenomena, the present invention utilizes circuit 2 to coerce the outputs of test pattern generator 200 into the pattern of all zeros. After passing through several clock periods, test pattern generator 200 will set the outputs of these shift registers into one of test patterns listed in Table 1. The outputted test pattern will then follow the sequence as depicted above in response to the clock signal.

Based on the above-mentioned concept, circuit 2 includes three D-type flip-flips 25, 26, 27, multiplexer 20, AND gate 28, and OR gate 29. Flip-flops 25 and 26, OR gate 29 and AND gate 28 form a two-bit down counter 30. A detailed description of each of these primary constituent parts follows.

Output $\overline{Q5}$ of flip-flop 25 is connected to input D5 thereof. Similarly, output $\overline{Q6}$ of flip-flop 26 is fed back to input D6. Both outputs Q5 and Q6 serve as two inputs of OR gate 29, and the output thereof is connected to AND gate 28 as one input signal. Another input of AND gate 28 is coupled to clock signal CLK, and the output thereof is connected to clock terminal CK6 of flip-flop 26. Furthermore, output Q6 of flip-flop 26 is connected to clock terminal CK5 of flip-flop 25.

Multiplexer 20 is provided with two control terminals S1 and S0 respectively connected to outputs Q5 and Q6 of flip-flops 25 and 26. Multiplexer 20 is a 3 to 1 multiplexer provided with three inputs and one output. The inputs are connected to output Q4 of shift register 14, first electric potential Logic_0, and second electric potential Logic_1 through lines 21, 22, and 23, respectively. First electric potential Logic_0 potential is connected to ground and the second electric represents Logic_1, power source Vcc (not shown). Multiplexer 20 selects one of three inputs to its output under the control of control signals S1 and S0 thereof. In this embodiment, the shift registers are connected to form a normally closed loop when (S1,S0) is set to (0,0). Logic_1 is provided to the output of multiplexer 20 when (S1,S0) is set to (0,1). Moreover, Logic 0 is provide to the output thereof when (S1,S0) is set to (1,X), wherein X represents don't care.

Figure 1:
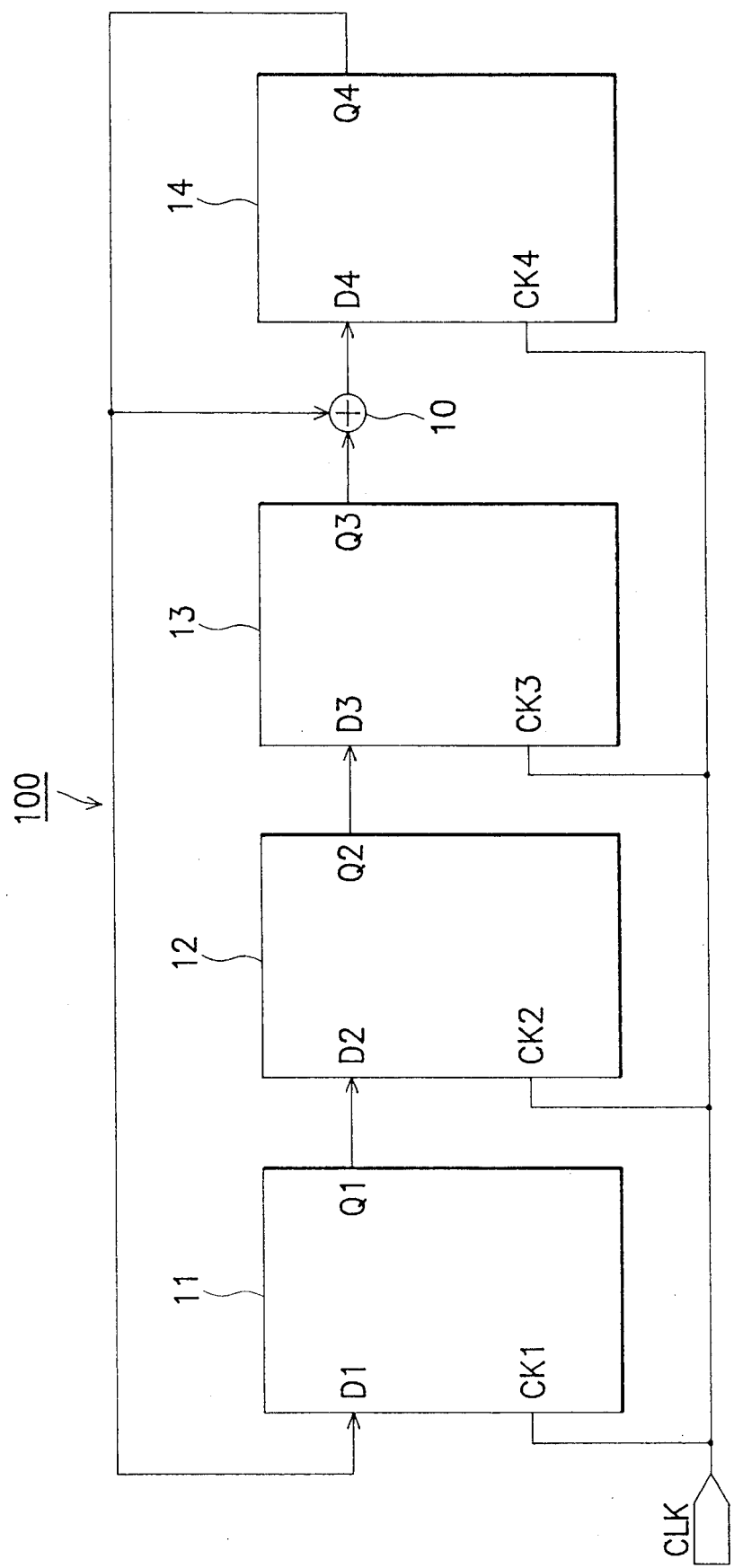
FIG. 1 schematically depicts the circuit of a conventional test pattern generator.

Flip-flop 27 functions as a shift register like shift registers 12, 13, and 14 for outputting the test patterns. It is provided with input D7 for connecting to the output of multiplexer 20 through line 24. Output Q7 of shift register 27 is connected to input D2 of second shift register 12. The connection of the remaining components, shift registers 12,13,14 and XOR gate 10, are the same as depicted for test pattern generator 100 in FIG. 1.

Clock signal CLK is connected to clock terminals CK7, CK2, CK3, and CK4 of shift registers 27, 12, 13, 14, respectively. Control signal BIST_RST is connected to setting terminals Sb5 and Sb6 of flip-flops 25 and 26, as well as clear terminals CR7, CR2, CR3, and CR4 of shift registers 27, 12, 13, and 14, respectively.

Figure 3:
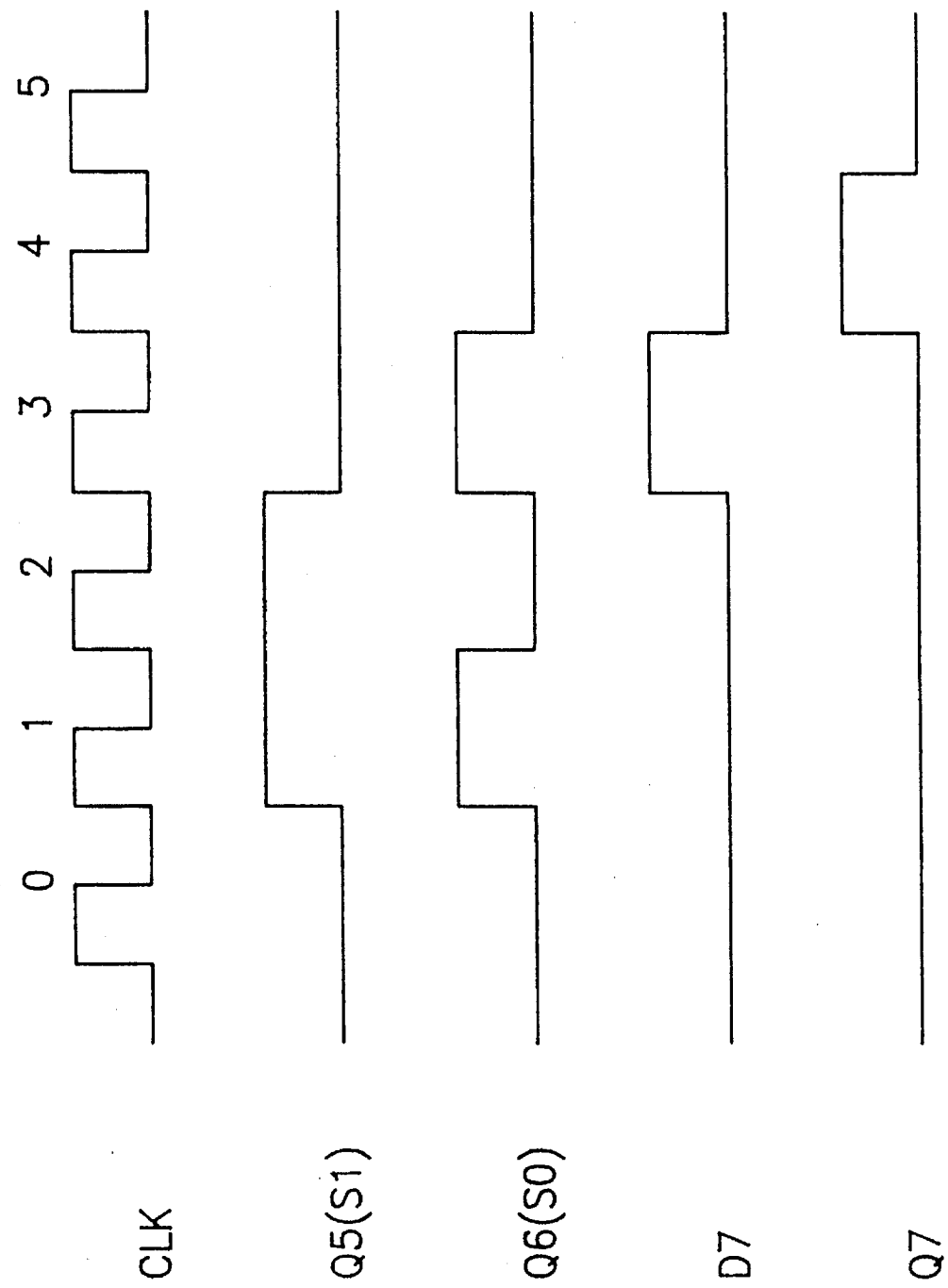
FIG. 3 depicts the timing diagram of FIG. 2.

When powered to start the built-in self test, test pattern generator 200 enables the control signal BIST_RST to clear all outputs Q7, Q2, Q3, and Q4 of the shift registers to zero through clear terminals CR7, CR2, CR3, and CR4, respectively, which coerces the test pattern into the pattern of all zeros. The control signal BIST_RST is activated after power on reset or while the detection of all zeros pattern occurs, such as resulting from external radiation interference. Also, outputs Q5 and Q6 of down counter 30 are both set to ones through setting terminals Sb5 and Sb6, respectively. In the meantime, because signals Q5 and Q6 raise the output of OR gate 29 to a logic 1 level, therefore clock signal CLK is coupled to clock terminal CR6 of flip-flop 26 through AND gate 28 to enable down counter 30 to count down. As shown in FIG. 3, which depicts the timing diagrams for the embodiment shown in FIG. 2, Q5(S1) still maintains the logic 1 level during the first and second CLK periods. Therefore, first electric potential Logic_0 is provided to input D7 of shift register 27 through multiplexer 20 and line 24 under the control of control terminals S1 and S0. Sequentially, while (Q5,Q6) counts down to the value of (0,1) during the third CLK period, second electric potential Logic_1 is provided to input D7 of shift register 27 via multiplexer 20 and line 24 under the control of S1 and S0. In the fourth CLK period, shift registers 27, 12, 13, and 14 are connected in the normally closed loop, because (Q5,Q6) counts down to (0,0), and consequently Q7 rises to logic 1 level. Afterwards, test pattern generator 200 circulates the test pattern in every fifteen CLK period according to the following Table 2.

TABLE 2

| CLK | Q7 | Q2 | Q3 | Q4 |
|-----|----|----|----|----|
| 4   | 1  | 0  | 0  | 0  |
| 5   | 0  | 1  | 0  | 0  |
| 6   | 0  | 0  | 1  | 0  |
| 7   | 0  | 0  | 0  | 1  |
| 8   | 1  | 0  | 0  | 1  |
| 9   | 1  | 1  | 0  | 1  |
| 10  | 1  | 1  | 1  | 1  |
| 11  | 1  | 1  | 1  | 0  |
| 12  | 0  | 1  | 1  | 1  |
| 13  | 1  | 0  | 1  | 0  |
| 14  | 0  | 1  | 0  | 1  |
| 15  | 1  | 0  | 1  | 1  |
| 16  | 1  | 1  | 0  | 0  |
| 17  | 0  | 1  | 1  | 0  |
| 18  | 0  | 0  | 1  | 1  |
| 19  | 1  | 0  | 0  | 0  |

Of note, however, is that circuit 2 of the present invention does not set a limit to one circuit 2 per test pattern generator. Shift registers 12, 13, and 14 can be also partially or totally replaced by circuit 2. Moreover, control signal BIST_RST can be triggered not only by a power on/reset operation, but also by the detection of the all zeros pattern through a detecting means when being affected by electromagnetic wave interference.

By means of the above, the present invention makes use of control circuit 2, which initially coerces the test pattern into a pattern of all zeros, and afterwards returns to normal operation for consecutively outputting the test patterns. In conclusion, the present invention can avoid self-looping nullifing the testing and provides an exhaustive set of test patterns.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A test pattern generator for successively outputting a plurality of test patterns in response to a clock signal, comprising:

a plurality of shift registers serially connected in a loop for successively outputting said test patterns in response to said clock signal;

at least one logic gate connected among said shift registers; and at least one control means, connected within said loop and responsive to a control signal, for setting said shift registers to an initial pattern in response to the control signal, for setting said shift registers to one of said test patterns in response to the control signal, and for successively outputting said test patterns through said shift registers in response to said clock signal, wherein said control means includes:

a multiplexer connected within said loop, said multiplexer having two input terminals and two control terminals, wherein said input terminals are connected to a first electric potential and a second electric potential, respectively; and a counter connected to said control terminals of said multiplexer for receiving said control signal and controlling said multiplexer, wherein said first electric potential is sent to said loop when said control signal is enabled, said second electric potential is sent to said loop thereafter in response to said clock signal, and said loop forms a closed loop through said multiplexer when said first electrical potential is sent to both of said two control terminals.

2. The test pattern generator as in claim 1, wherein said counter is a down counter.

3. The test pattern generator as in claim 1, wherein said first electric potential is the voltage level representing logic 0.

4. The test pattern generator as in claim 1, wherein said second electric potential is the voltage level representing logic 1.

5. The test pattern generator as in claim 1, wherein said shift registers are D-type flip-flops.

6. The test pattern generator as in claim 5, wherein said initial pattern represents that all outputs of said D-type flip-flops are logic 0.

7. The test pattern generator as in claim 1, wherein said logic gate is an exclusive-OR gate.

8. A method for successively generating a plurality of test patterns in response to a clock signal comprising the steps of:

serially connecting a plurality of shift registers in a loop for successively outputting said test patterns in response to said clock signal;

connecting at least one logic gate among said shift registers;

connecting at least one control means within said loop, said control means, in response to a control signal,:

setting said shift registers to an initial pattern, setting said shift registers to one of said test patterns, and successively outputting said test patterns through said shift registers in response to said clock signal, wherein the step of connecting at least one control means within said loop includes the steps of:

connecting a multiplexer within said loop, said multiplexer having two input terminals and two control terminals, wherein said input terminals are connected to a first electric potential and a second electric potential, respectively; and connecting a counter to said control terminals of said multiplexer for receiving said control signal and controlling said multiplexer, wherein said first electric potential is sent to said loop when said control signal is enabled, said second electric potential is sent to said loop thereafter in response to said clock signal, and said loop forms a closed loop through said multiplexer when said first electrical potential is sent to both of said two control terminals.

* * * * *